United States Patent [19]  
Priddy

[11] Patent Number: 4,789,730  
[45] Date of Patent: Dec. 6, 1988

[54] PREPARATION OF POLYCARBONATE HAVING REDUCED CYCLIC CARBONATE OLIGOMER CONTENT

[75] Inventor: Duane B. Priddy, Midland, Mich.

[73] Assignee: The Dow Chemical Company, Midland, Mich.

[21] Appl. No.: 871,024

[22] Filed: Jun. 5, 1986

[51] Int. Cl.$^4$ .............................................. C08G 63/62
[52] U.S. Cl. ...................................... 528/498; 526/68; 528/196; 528/488; 528/489; 528/491; 528/494; 528/497
[58] Field of Search ............... 528/498, 488, 489, 491, 528/494, 497, 196; 526/68

[56] References Cited

U.S. PATENT DOCUMENTS 3,264,262 8/1966 Baker et al. .......................... 528/498
3,264,263 8/1966 Baker et al. .......................... 528/498
4,663,433 5/1987 Pyles et al. .......................... 528/498

*Primary Examiner*—Harold D. Anderson
*Attorney, Agent, or Firm*—Benjamin G. Colley

[57] ABSTRACT

The present invention is directed to a continuous process which removes the 1 to 3% cyclic oligomers formed in the polycarbonate process and after hydrolysis of the oligomers recycles the resulting monomer for use in the reaction forming the polycarbonates. To remove the cyclic oligomers to a level so as to produce an improved polycarbonate product and to recover the oligomers in an economical manner for recycling in a continuous process, the selection of a solvent is unique and essential to achieve the continuous process. The solvent for the cyclic oligomers must be immiscible with water, must not react with an alkali and have a cohesive energy density of less than 90.

21 Claims, 2 Drawing Sheets

PREPARATION OF POLYCARBONATE HAVING REDUCED CYCLIC CARBONATE OLIGOMER CONTENT

BACKGROUND OF THE INVENTION

I. Field of the Invention

The present invention is directed to an improved process for producing polycarbonates having improved low-temperature toughness which includes removal of the cyclic oligomers to a level less than 1%. More specifically, the cyclic oligomers are removed with a solvent having a cohesive energy density less than 90, is immiscible with water and not reactive to alkali and the cyclic oligomers recycled whereby the cyclic oligomers are hydrolyzed to monomers so that a continuous process may be employed.

II. Description of the Prior Art

According to the method in U.S. Pat. No. 3,240,755, a mixture of solvents is utilized to precipitate polycarbonate resin for the purpose of obtaining a uniform average molecular weight. This patent utilizes cohesive energy density as a tool to define the partial solvents employed in the process to obtain the desired average molecular weight polycarbonate. The patent has a recycling system but fails to recognize the presence of cyclic oligomers or to disclose the hydrolysis thereof in a continuous recycle process.

According to patent U.S. Pat. No. 3,668,181, the crude precipitated polycarbonate resin manufactured in accordance with the method of U.S. Pat. No. 3,240,755 is purified by extraction with aqueous methanol or dimethoxy-ethane or a mixture thereof.

Still further, U.S. Pat. No. 3,410,823 is directed to a method for removing contaminates from high-molecular weight polycarbonates by mixing the contaminated polycarbonates with a liquid inert non-solvent for the carbonate which is a good solvent for the contaminates in removing the contaminates with the solvent. The solvents disclosed are low boiling ketones, in particular, acetone and low boiling dialkyl ethers. Similarly, a polycarbonate purification process is disclosed in U.S. Pat. No. 3,213,060 which utilizes swelling agents such as esters of carboxylic acids or water immisicible ketones or ethers.

SUMMARY OF THE INVENTION

The present invention is directed to a continuous process which removes the 1 to 3% cyclic oligomers formed in the polycaronate process and after hydrolysis of the oligomers recycles the resulting monomer for use in the reaction forming the polycarbonates. To remove the cyclic oligomers to a level so as to produce an improved polycarbonate product and to recover the oligomers in an economical manner for recycling in a continuous process, the selection of a solvent is unique and essential to achieve the continuous process. The solvent for the cyclic oligomers must be immiscible with water, must not react with an alkali and have a cohesive energy density of less than 90. The cohesive energy density of a compound may be calculated in accordance with the method outlined in J. Appl. Chem., 3, 71–80 Feb. 1953 "Some Factors Affecting the Solubility of Polymers" by P. A. Small which is incorporated herein by reference.

BRIEF DESCRIPTION OF THE DRAWINGS

The present invention will be more readily apparent from the consideration of the appended drawings.

DESCRIPTION OF THE INVENTION

Figure 1:
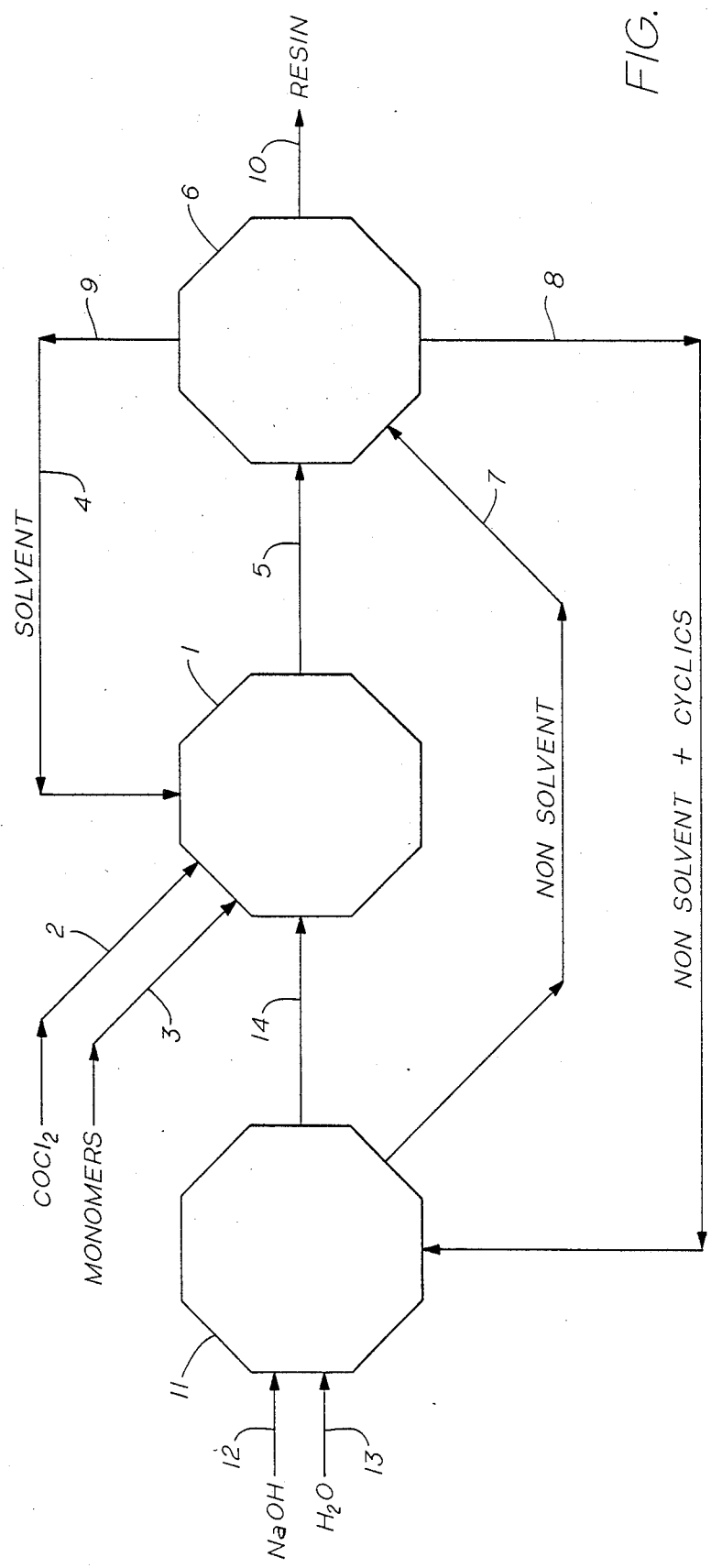
FIG. 1 diagrammatically illustrates the process of the present invention.
Figure 2:
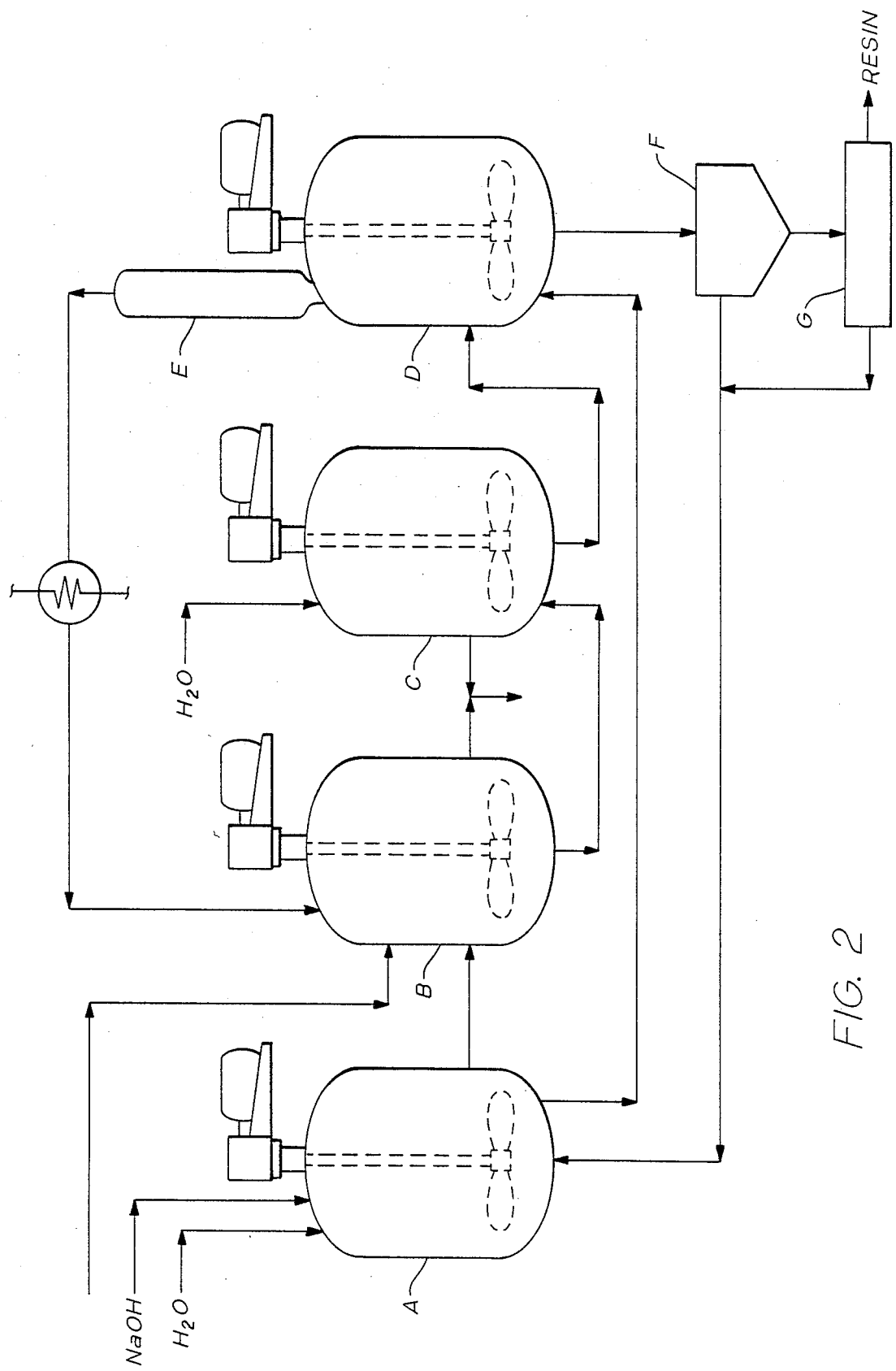
FIG. 2 diagrammatically illustrates a preferred embodiment of the present invention.

Referring to FIG. 1, the present invention preferably relates to an improvement to the two-phase interfacial polycarbonate process. Into a reactor 1 is introduced a carbonyl halide through feedline 2. The preferred carbonyl halide is carbonyl chloride or more usually referred to as phosgene. Also introduced into reactor 1 is at least one dihydric phenol through feedline 3 which reacts with the phosgene to produce the polycarbonate polymers of the present invention. Preferably, added to the reactor 1 are a chain stopper or molecular weight control compound and a catalyst. These may have separate feedlines (not shown) or may be added through the respective feedlines 2 and 3. In the preferred two-phase interfacial polycarbonate process of the present invention, a solvent is used for the dihydric phenol. This solvent is hereinafter sometimes referred to as the reaction solvent. The solvent may be introduced by feedline 4 to the reactor 1. In a preferred process, the dihydric phenol is bisphenol-A or (2,2-bis(4-hydroxy phenyl) propane), the reaction solvent is methylene chloride and the chain stopper or molecular weight control compound is phenol. These materials are introduced into reactor 1 with water which forms the two-phase system with the water phase maintained at a pH of at least 10 by the addition of an alkali hydroxide such as sodium hydroxide. The contents of the reactor are well agitated and the carbonyl halide, preferably phosgene, is then introduced at a controlled rate. To the mixture of reactants may be added a catalyst such as triethylamine. The dihydric phenol and carbonyl halide monomers are hereinafter sometimes referred to as comonomers.

The desired polycarbonate polymer is produced and recovered in the organic phase. The organic phase containing the polycarbonate polymer is removed from reactor 1 by line 5 and is introduced into a separator 6. Separator 6 performs several functions including mixing, solid/liquid separation and solvent recovery. Therefore, separator 6 may consist of more than one unit, each unit performing a separate function.

The organic phase containing the polycarbonate polymer and flowing from reactor 1 to separator 6 by line 5 is rich in oligomers. According to the present invention, those oligomers are removed from the organic phase in separator 6 by contacting the organic phase containing the polycarbonate polymer with an appropriate solvent, hereinafter sometimes referred to as the extraction solvent or nonsolvent. The extraction solvent shall have a cohesive energy density (C.E.D.) of less than 90, shall be immiscible with water and shall not react with alkali. In addition to being suitable for the removal of cyclic oligomers from the polycarbonate polymers present in the organic phase, the extraction solvent shall be suitable for providing a medium for hydrolysis to convert the oligomers to a monomer for recycling the monomer to reactor 1 as a reactant. A preferred solvent is heptane which, when mixed in separator 6 with the stream from reactor 1, dissolves the cyclic oligomers, the unreacted dihydric phenol, and other low molecular weight material.

The solid/liquid function of separator 6 includes the separation of the solid washed polycarbonate from the dissolved materials. The separation may be done by conventional solid/liquid separation processes such as filtration, centrifuging, etc.

In separator 6, the reaction solvent, i.e., methylene chloride, is removed from the polycarbonate polymer and from the extraction solvent that contains the dissolved cyclic oligomers, unreacted dihydric phenol, etc., by flashing. The flashed reaction solvent is removed from separator 6 by line 9 and is reintroduced to reactor 1 by line 4. The reaction solvent is easily separated from the extraction solvent by flashing because the reaction solvent has a lower boiling.

The purified polycarbonate polymer having a very low residue of cyclic oligomers and material of low molecular weight is recovered from the separator 6 by line 10. The extraction solvent solution with the dissolved cyclic oligomers is removed from separator 6 by line 8.

According to the present invention, the heptane fraction recovered from the separator by line 8 is introduced into a hydrolysis reactor 11. Into the reactor 11 is added sodium hydroxide, water and preferably a quaternary ammonium salt as a catalyst for the hydrolysis. In the hydrolysis reactor 11, the cyclic oligomers are hydrolyzed back to the corresponding dihydric phenol which produced the cyclic oligomer. These dihydric phenols being monomers in the process together with the sodium hydroxide are removed from the reactor 11 by line 14 for introduction to reactor 1. The organic phase or the heptane solvent is removed from reactor 11 by line 7 for introduction to the separator 6. Thus, according to the present invention, a continuous cyclic process is disclosed wherein and improved polycarbonate resin is produced. More importantly, the present process economically recovers the cyclic oligomers and low molecular weight materials, recycles and hydrolyzes these oligomers to monomers which have not heretofore been done by the prior processes.

While specific reactants and solvents have been used to illustrate the process of the present invention, the process is not limited to those materials, especially as reactants in the production of the polycarbonate polymers. The dihydric phenols used to produce the polycarbonate polymers are well known in the art and those besides bisphenol-A which may be used in the present invention may include the following:
4,4'-dihydroxy-diphenyl;
1,6-dihydroxy-naphthalene;
2,6-dihydroxy-naphthalene;
4,4'-dihydroxy-diphenyl methane;
4,4'-dihydroxy-diphenyl-1,1-ethane;
4,4'-dihydroxy-diphenyl-1,1-butane;
4,4'-dihydroxy-diphenyl-1,1-isobutane;
4,4'-dihydroxy-diphenyl-1,1-cyclopentane;
4,4'-dihydroxy-diphenyl-1,1-cyclohexane;
4,4'-dihydroxy-diphenyl-phenyl methane;
4,4'-dihydroxy-diphenyl-2-chlorophenyl methane;
4,4'-dihydroxy-diphenyl-2,4-dichlorophenyl methane;
4,4'-dihydroxy-diphenyl-p-isopropylphenyl methane;
4,4'-dihydroxy-diphenyl-2,2-propane;
4,4'-dihydroxy-3-methyl-diphenyl-2,2-propane;
4,4'-dihydroxy-3-cyclohexyl-diphenyl-2,2-propane;
4,4'-dihydroxy-3-methoxy-diphenyl-2,2-propane;
4,4'-dihydroxy-3,3'-dimethyl-diphenyl-2,2-propane;
4,4'-dihydroxy-3,3'-dichloro-diphenyl-2,2-propane;
4,4'-dihydroxy-diphenyl-2,2-butane;
4,4'-dihydroxy-diphenyl-2,2-pentane;
4,4'-dihydroxy-diphenyl-2,2-(4-methylpentane);
4,4'-dihydroxy-diphenyl-2,2-n-hexane;
4,4'-dihydroxy-diphenyl-2,2-nonane;
4,4'-dihydroxy-diphenyl-4,4-heptane;
4,4'-dihydroxy-diphenyl phenylmethyl methane;
4,4'-dihydroxy-diphenyl-4-chlorophenylmethyl methane;
4,4'-dihydroxy-diphenyl-2,5-dichlorophenylmethyl methane;
4,4'-dihydroxy-diphenyl-3,4-dichlorophenylmethyl methane;
4,4'-dihydroxy-diphenyl-2-naphthylmethyl methane;
4,4'-dihydroxy-tetraphenyl methane;
4,4'-dihydroxy-diphenyl-1,2-ethane;
4,4'-dihydroxy-diphenyl-1,10-n-decane;
4,4'-dihydroxy-diphenyl-1,6(1,6-dioxo-n-hexane);
4,4'-dihydroxy-diphenyl-1,10(1,10-dioxo-n-decane);
bis-p-hydroxy-phenylether-4,4'-biphenyl;
a,a,a'a'-tetramethyl-a,a'-(di-p-hydroxyphenyl)-p-xylene;
a,a,a',a'-tetramethyl-a,a'-(di-p-hydroxyphenyl)-m-xylene;
4,4'-dihydroxy-3,3'-dimethyl-diphenyl methane;
4,4'-dihydroxy-2,2'-dimethyl-diphenyl methane;
4,4'-dihydroxy-3,3'-dichloro-diphenyl methane;
4,4'-dihydroxy-3,3'-dimethoxy-diphenyl methane;
4,4'-dihydroxy-2,2',5,5'-tetramethyl-diphenyl methane;
4,4'-dihydroxy-2,2'-dimethyl-5,5'-diisopropyldiphenyl methane;
4,4'-dihydroxy-2,2'-dimethyl-5,5'-dipropyl-diphenyl methane;
4,4'-dihydroxy-diphenyl-5,5-nonane;
4,4'-dihydroxy-diphenyl-6,6-undecane;
4,4'-dihydroxy-diphenyl-3,3-butanone-2;
4,4'-dihydroxy-diphenyl-4,4-hexanone-3;
4,4'-dihydroxy-diphenylmethyl-4-methoxyphenyl methane;
4,4'-dihydroxy-diphenyl ether;
4,4'-dihydroxy-diphenyl sulfide;
4,4'-dihydroxy-3,3'-dimethylphenyl sulfide;
4,4'-dihydroxy-diphenyl sulfoxide;
4,4'-dihydroxy-diphenyl sulfone;
4,4'-dihydroxy-3,3'-dichlorodiphenyl sulfone;
2,2'-bis(4-hydroxy-phenyl)-1-chloroethylene;
2,2'-bis(4-hydroxy-phenyl)-1,1-dichloroethylene; and
2,2'-bis(4-hydroxy-phenyl)-1,1-dibromoethylene, etc.

Also dihydric phenols of the following structure may be optionally employed in the practice of this invention:
1,1-bis(4-hydroxy-3,5-dimethylphenyl)methane;
2,4'-dihydroxy-3,3',5,5'-tetramethyldiphenyl methane;
1,1-bis(3,5-diethyl-4-hydroxyphenyl)methane;
1,1-bis(3,5-diisopropyl-4-hydroxyphenyl)methane;
1,1-bis(3,5-dibromo-4-hydroxyphenyl)methane;
1,1-bis(3,5-dimethyl-4-hydroxyphenyl)ethane;
1,1-bis(3-methyl-5-ethyl-4-hydroxyphenyl)ethane;
1,1-bis(3,5-diethyl-4-hydroxyphenyl)ethane;
2,2-bis(3-methyl-5-ethyl-4-hydroxyphenyl)propane;
2,2-bis(3,5-dibromo-4-hydroxyphenyl)propane;
2,2-bis(3,5-diisopropyl-4-hydroxyphenyl)propane;
2,2-bis(4-hydroxy-3,5-dimethylphenyl)propane;
2,2-bis(3,5-dibromo-4-hydroxyphenyl)butane;
2,4'-dihydroxy-3,3',5,5'-tetramethylbenzophenone;
4,4'-dihydroxy-3,3',5,5'-tetraethyldiphenyl sulfone;
4,4'-dihydroxy-3,3',5,5'-tetraethyldiphenyl sulfide;
4,4'-dihydroxy-3,3',5,5'-tetramethyldiphenyl ether;

4,4'-dihydroxy-3,3',5,5'-tetrapropyldiphenyl sulfoxide;
2,2'-bis(3,5-dimethyl-4-hydroxyphenyl)-1-chloroethylene;
2,2'-bis(3,5-dimethyl-4-hydroxyphenyl)-1,1-dichloroethylene;
and
2,2'-bis(3,5-dibutoxy-4-hydroxyphenyl)-1,1-dibromoethylene,
etc.

While phosgene is the preferred carbonyl halide, carbonyl dibromide, carbonyl diiodide, carbonyl difluoride, carbonylchlorofluoride, including mixutes thereof may also be employed.

The process parameter relating to pH is established by combining the organic phase and the aqueous phase containing sufficient quantities of alkali metal hydroxide to establish under equilibrium conditions of pH of at least 10, preferably between 11 and 13. In general, establishing the pH range described above requires a strong alkali metal base, such as sodium hydroxide or potassium hydroxide, preferably the sodium hydroxide, in amounts of from 0.25 to 1.4 mols of sodium hydroxide per mol of dihydric phenol reactant employed in the process.

According to the present invention, the choice of reaction solvent for the reaction to form the polycarbonate polymer and the choice of solvent (non-solvent to polycarbonate polymer) to remove cyclic oligomers is unique to the continuous recycling process of the invention. The solvents both must be immiscible with water and not reactive to alkali, that is the sodium hydroxide employed to control the pH; however, the solvents must be miscible with each other. Heretofore, the choice of a solvent in the process to form polycarbonate polymers involved its use in the reaction to form the polycarbonate polymer or possibly a solvent was selected due to its ability to dissolve undesirable material from the product of the reaction. However, in the present invention, the choice of solvents not only involve their ability to function in the process, either the production of the polycarbonate polymers or the removal of cyclic oligomers from the polycarbonate but, as importantly to be employed in a continuous recycling process. This choice of solvents does not become apparent until first, it is recognized that cyclic oligomers are produced in the conventional processes to form polycarbonate polymers and second, that a useful process can be accomplished by hydrolyzing these cyclic oligomers.

A suitable solvent for the reactants in the production of the polycarbonate polymers, i.e. reactant solvent, according to the present invention, must have a cohesive energy density of greater than 90, is immiscible with water and non-reactive with alkali. Suitable solvents are methylene chloride and ethylene chloride.

Due to the uniqueness of the solvent selection in the process of the present invention, solvents which have heretofore been employed in polycarbonate production such as dimethylformamide, dimethylacetamide, tetrahydrofuran, pyridine, dioxane, all of which are water miscible as well as chloroform and cresol which react with alkali are solvents not suitable for the present process.

The extraction solvent employed for the removal of the cyclic oligomers formed in the production of the polycarbonate polymers is one which must have a cohesive energy density less than 90, must be immiscible with water, and must be non-reactive with alkali. Suitable extraction solvents are aliphatic hydrocarbons, such as heptane and cyclohexane, olefins such as octene and perchloroethylene; aromatic hydrocarbons, such as xylene; butylether; and butylchloride.

Again, such solvents heretofore employed in the production of polycarbonate polymers such as ketones specifically, acetone or methylethylketone and esters such as ethylacetate will not work in the present invention because of their reaction with alkali. Likewise, materials such as alcohols, specifically, ethanol and isopropanol will not work in the present invention because they are water miscible.

As heretofore pointed out, the selection of the solvents used in the present invention is unique to their ability to have a continuous recycling process according to the present invention. While the selection of methylene chloride and heptane are preferred and illustrate the best mode, these are not the sole solvents suitable for carrying out the process of the present invention.

The continuous process of the present invention is carried out in a semi-batch manner in a series of Pfaudler kettles equipped with stirrers. The first Pfaudler kettle (kettle A) is equipped to carry out the hydrolysis of the cyclic oligomers and other low molecular weight materials. This kettle equipped with a stirrer has an inlet for the nonsolvent and cyclics as well as the inlet for water and the base and, where desired, a catalyst. The mixture is heated to the boiling point of water (about 100° C.) with agitation. After sufficient period for hydrolysis to occur, the agitation is stopped to permit two phases to be formed. In the aqueous phase are the water and base but also the salt of the hydrolyzed oligomers, namely the monomers in the salt form usually as the alkali. The other phase is the solvent used to remove the cyclics, as illustrated above, heptane. Although it is not illustrated in the drawing, between vessels may be holding tanks which also serve to adjust temperatures between the kettles. The aqueous phase may be drained off to a holding tank in line 14 and thereafter the organic phase is drained off to a holding tank in line 7.

The second Pfaudler kettle (kettle B) is the polycarbonate reactor. Into this kettle is introduced some of the monomer from the holding tank in line 14 as well as fresh monomer terminators and catalysts as well as reaction solvent introduced from a holding tank in line 4. The reactor vessel is usually maintained at ambient temperatures to carry out in a conventional manner the interfacial polymerization of the monomer to form the polycarbonate polymer. The reaction is carried out with the stirrer in the kettle causing agitation and occurs over a period of more than one hour, sometimes several hours. After the polymerization is terminated, usually by the addition of a catalyst and a period of time for the polymerization to reach its maximum, the stirrer is shut off. The polymerization mixture forms the two phases and the aqueous phase which has been maintained by the addition of sodium hydroxide at a pH in excess of 10 is removed for disposal. The organic phase is then removed and passed to a third kettle (kettle C).

The third kettle represents the first of several pieces of equipment that could be included within the separator 6. Into this third kettle is introduced water and the mixture is agitated to wash the salts from the polymer solution. To accomplish the desired reduction of salt measured either as the sodium or as the chloride ion, more than one wash cycle or wash kettle may be employed. The washing operation is usually carried out at ambient temperatures. After each washing of the polymer solution with water, the aqueous phase is removed for disposal and it is the analytical testing of the aqueous phase which determines whether sufficient washing has occurred.

The washed polymer solution having the salt reduced down to the parts per million level, is then introduced into a fourth kettle (kettle D). Into this vessel is also added the extraction solvent or nonsolvent from the holding tank in line 7 and this vessel may be heated during the agitation of the mixture to remove the reaction solvent, methylene chloride, as illustrated above. Kettle D may additionally be equipped with a reflux distillation tower E for the clean separation of the reaction solvent as compared to the solvent which will act as a solvent for the cyclic oligomers and other low molecular weight materials. With the removal of the reaction solvent, the polycarbonate polymer when mixed with the extraction solvent for the cyclic oligomers, which is a nonsolvent for the polycarbonate polymer, begins to precipitate. The reaction solvent being distilled from the kettle D is removed to a holding tank in line 4 where the reaction solvent is cooled. Thereafter, the remaining mixture is removed from kettle D to a centrifuge F.

In the centrifuge F the extraction solvent or nonsolvent for the polycarbonate polymer which includes or has dissolved therein the cyclic oligomers is removed and a filter cake of the desired polycarbonate polymer is formed. This wet polymer, now in the form of a powder, is removed to a devolatilizer G to remove any remaining nonsolvent. This piece of equipment may be a vented extruder which permits the nonsolvent to be removed and combined with the nonsolvent removed from the centrifuge (the combined streams making up essentially line 8) to a holding tank for reintroduction into kettle A. From the vented extruder is removed the desired polycarbonate polymer which then may be formed into pellets as the desired manufactured product.

The equipment beginning with kettle B to the extruder is that which may be conventionally used in the production of polycarbonate polymers and the only additional equipment in the process of the present invention is the hydrolysis kettle as well as some modifications to the solvent recovery in that two solvents are used.

The present invention may be illustrated by the following specific examples:

EXAMPLE I 275 parts of Bisphenol A, four parts of phenol, 1500 parts of water and 1500 parts of methylene chloride were placed in a well-agitated six-necked flask, equipped with a mechanical stirrer, gas inlet tube (extending below the liquid level), thermometer, pH electrode, caustic inlet and a vent (vent gases are passed through a caustic scrubber). Nitrogen was passed into the flask for ten minutes after which 200 parts of 50% aqueous sodium hydroxide was added. The flask was cooled to 25°+/−2° C., using external cooling. Phosgene was added at a rate of five parts/minute. After 90 parts had been added, 100 parts of 50% aqueous sodium hydroxide was added over ten minutes, during which time phosgene addition was continued. After 150 parts of phosgene had been added, two parts of triethylamine was added. After stirring for another ten minutes, agitation was stopped. The mixture was poured into a separator funnel where it was washed three times with water. The methylene chloride polymer solution was added to 1.3 times its volume of heptane. The resulting mixture was mixed vigorously for one minute and then filtered.

The heptane/methylene chloride filtrate was placed in a distillation flask along with 1500 parts of water, 200 parts of 50% sodium hydroxide and 3 parts of triethylbenzylammonium chloride. Methylene chloride was distilled from the pot until the temperature reached 100° C. The methylene chloride distillate and the aqueous phase from the distillation pot were transferred to the polymerization reactor. Another 260 parts of bisphenol-A and 3.9 parts of phenol were added and another polymerization cycle carried out with identical results.

EXAMPLE II

A commercial polycarbonate having a melt flow rate at condition O (ASTM D1238) of 22 g/10 min and containing 2 percent by weight cyclic oligomers, was found to have a ductile/brittle transition temperature of 24° F. (ASTM D256). The ductile/brittle transition temperature is the temperature at which a plastic changes from breaking ductile to breaking brittle during the ASTM D256 Notched Izod test. The lower the ductile/brittle transition temperature, the tougher the plastic is at low temperatures. Some of the same commercial polycarbonate (1 part) was then dissolved in methylene chloride (9 parts). Heptane (13 parts) was then added to the polymer solution with mild stirring over a 1-minute period. The resulting clear solution was allowed to stand undisturbed for 1 hour. The resulting slurry was filtered to remove the crystalline polycarbonate which was found to contain less than 0.2% by weight cyclic oligomers. The ductile/brittle transition temperature of this crystalline polycarbonate sample was found to be −11° F.

While the invention has been described herein with reference to certain specific materials, procedures and examples, it is understood that the invention is not restricted to the particular materials, combination of materials and procedures selected for the purpose of illustration. Numerous variations of such details can be employed by those skilled in the art within the scope of this invention which is defined by the appended claims.

What is claimed is:

1. A process for producing a polycarbonate mixture product that contains less than one (1) percent cyclic carbonate oligomers, comprising the steps of:
   reacting in the presence of an inert organic solvent a carbonyl halide and a comonomer which together with the carbonyl halide is capable of producing a polycarbonate to obtain a polycarbonate mixture that contains the polycarbonate and more than one (1) percent of cyclic carbonate oligomers;
   separating the cyclic carbonate oligomers from the polycarbonate by mixing the polycarbonate mixture with an extraction solvent having a cohesive density of less than 90 and being immiscible with water and inert to a strong base; and
   hydrolyzing the separated cyclic carbonate oligomers to form the comonomer that is suitable for reacting with the carbonyl halide to form the polycarbonate.

2. A process according to claim 1 further including the step of recycling the comonomer formed in the hydrolyzing step to the reacting step to react the comonomer with the carbonyl halide thereby forming additional polycarbonate.

3. A process according to claim 1 further including the step of removing the reaction solvent from the polycarbonate mixture and reintroducing the reaction solvent to the reacting step for further use as an inert organic reaction solvent in the reaction between the carbonyl halide and the comonomer.

4. A process according to claim 1 wherein the hydrolyzing step is carried out by interacting the cyclic carbonate oligomers with a strong base in the presence of the extraction solvent to form a comonomer/extraction solvent mixture.

5. A process according to claim 1 wherein the comonomer is a dihydric phenol.

6. A process according to claim 5 wherein the dihydric phenol is 2,2 bis (4-hydroxy phenyl) propane and the carbonyl halide is phosgene.

7. A process according to claim 4 wherein the base is an alkali metal hydroxide.

8. A process according to claim 7 wherein the alkali metal hydroxide is sodium hydroxide.

9. A process according to claim 1 wherein the inert organic reaction solvent is methylene chloride.

10. A process according to claim 1 wherein the extraction solvent is heptane.

11. A process according to claim 4 further including the step of removing the extraction solvent from the comonomer/extraction solvent mixture following the hydrolyzing step and introducing the extraction solvent to the separation step for further mixing with the polycarbonate mixture.

12. A process for producing a polycarbonate mixture product that contains less than one (1) percent cyclic carbonate oligomers, comprising the steps of:
reacting a carbonyl halide and a comonomer which together with the carbonyl halide is capable of producing a polycarbonate to obtain a polycarbonate mixture product that contains the polycarbonate, linear carbonate oligomers and more than one (1) percent of cyclic carbonate oligomers;
separating the linear and cyclic carbonate oligomers from the polycarbonate by mixing the polycarbonate mixture with an extraction solvent having a cohesive density of less than 90 and being immiscible with water and inert to a strong base; and
hydrolyzing the separated linear and cyclic carbonate oligomers to form the comonomer that is suitable for reacting with the carbonyl halide to form the polycarbonate.

13. A process according to claim 12 further including the step of recycling the comonomer formed in the hydrolyzing step to the reacting step to react the comonomer with additional carbonyl halide thereby forming additional polycarbonate.

14. A process according to claim 12 wherein the step of reacting the carbonyl halide and the comonomer is carried out in the presence of an inert organic reaction solvent.

15. A process according to claim 2 wherein the hydrolyzing step is carried out by interacting the linear and cyclic carbonate oligomers with a strong base in the presence of the extraction solvent to form a comonomer/extraction solvent mixture.

16. A process according to claim 12 wherein the comonomer is a dihydric phenol.

17. In a process of producing a polycarbonate by reacting a first comonomer with a carbonyl halide comonomer wherein the polycarbonate product contains the polycarbonate and more than one (1) percent carbonate oligomers, an improvement comprising the steps of:
separating the carbonate oligomers from the polycarbonate by mixing the polycarbonate product with an extraction solvent having a cohesive density of less than 90 and being immiscible with water and inert to a strong base; and
hydrolyzing the carbonate oligomers to form the first comonomer which is suitable for the production of the polycarbonate by reacting with the carbonyl halide comonomer.

18. A process according to claim 17 wherein the step of hydrolyzing the carbonate oligomers is carried out in the presence of the extraction solvent.

19. A process according to claim 17 wherein the comonomer is a dihydric phenol.

20. A process according to claim 18 wherein the step of hydrolyzing the carbonate oligomers is carried out also in the presence of a strong base and water.

21. A process according to claim 17 further including the step of reacting the first comonomer formed in the hydrolyzing step with additional carbonyl halide comonomer to form additional polycarbonate

* * * * *